(12) United States Patent
Li

(10) Patent No.: US 12,535,959 B2
(45) Date of Patent: Jan. 27, 2026

(54) MANAGING MEMORY SPACE ALLOCATION

(71) Applicant: Yangtze Memory Technologies Co., Ltd., Hubei (CN)

(72) Inventor: Jingui Li, Wuhan (CN)

(73) Assignee: Yangtze Memory Technologies Co., Ltd., Wuhan (CN)

( * ) Notice: Subject to any disclaimer, the term of this patent is extended or adjusted under 35 U.S.C. 154(b) by 0 days.

(21) Appl. No.: 18/789,588

(22) Filed: Jul. 30, 2024

(65) Prior Publication Data

US 2025/0383799 A1    Dec. 18, 2025

(30) Foreign Application Priority Data

Jun. 13, 2024   (CN) .......................... 202410763980.4

(51) Int. Cl.
*G06F 3/06* (2006.01)

(52) U.S. Cl.
CPC .......... *G06F 3/0631* (2013.01); *G06F 3/0604* (2013.01); *G06F 3/0679* (2013.01)

(58) Field of Classification Search
CPC ..... G06F 3/0631; G06F 3/0604; G06F 3/0679
See application file for complete search history.

(56) References Cited

U.S. PATENT DOCUMENTS

| 6,049,802 A * | 4/2000 | Waggener, Jr. ......... G06F 5/065 707/999.1 |
| 9,262,554 B1 * | 2/2016 | Bailey ................... G06F 12/023 |
| 12,298,912 B1 * | 5/2025 | Biswal ................ G06F 12/0246 |
| 2002/0144073 A1 * | 10/2002 | Trainin ................. G06F 12/023 711/170 |
| 2013/0024631 A1 * | 1/2013 | Balasubramanian ..... G06F 9/30 711/E12.001 |
| 2015/0302126 A1 * | 10/2015 | Hamid .................. G06F 3/0484 716/136 |
| 2020/0259766 A1 * | 8/2020 | Tian ...................... H04L 49/901 |
| 2024/0143473 A1 * | 5/2024 | Lim .................... G06F 11/0775 |

* cited by examiner

*Primary Examiner* — Ryan Bertram
(74) *Attorney, Agent, or Firm* — Fish & Richardson P.C.

(57) ABSTRACT

Methods, systems, and computer-readable storage media for allocating memory space are provided. In one aspect, a method includes receiving data to be stored in a memory space that includes one or more free spaces. The method further includes identifying a first free space of the one or more free spaces based on a first queue and a second queue. The first queue includes one or more addresses corresponding to end addresses of the one or more free space, and the second queue includes one or more addresses corresponding to start addresses of the one or more free spaces. The method further includes storing the data in the first free space, adding an address corresponding to a start address of the first free space to the first queue, and adding an address corresponding to an end address of the first free space to the second queue.

20 Claims, 9 Drawing Sheets

MANAGING MEMORY SPACE ALLOCATION

CROSS-REFERENCE TO RELATED APPLICATIONS

This application claims priority to Chinese Patent Application No. 202410763980.4, filed on Jun. 13, 2024, which is hereby incorporated by reference in its entirety.

TECHNICAL FIELD

The present disclosure generally relates to methods, systems, and computer-readable storage media for managing memory space allocation.

BACKGROUND

A memory system can include one or more memory devices and a memory controller that manages the data stored in the one or more memory devices and communicates with a host. During a design process of a memory system, a verification system (e.g., a verification system in accordance with Universal Verification Methodology (UVM)) can test functions and operations of the memory system or a portion of the memory system, e.g., a memory controller.

SUMMARY

The present disclosure provides methods, systems, and computer-readable storage media for allocating memory space. In one aspect, a method includes receiving data to be stored in a memory space that includes one or more free spaces. The method further includes identifying a first free space of the one or more free spaces based on a first queue and a second queue. The first queue includes one or more addresses corresponding to end addresses of the one or more free space, and the second queue includes one or more addresses corresponding to start addresses of the one or more free spaces. The method further includes storing the data in the first free space, adding to the first queue an address corresponding to a start address of the first free space, and adding to the second queue an address corresponding to an end address of the first free space.

In some implementations, the first queue includes an end address of the memory space, and the second queue includes a start address of the memory space.

In some implementations, the first queue and the second queue each include K addresses arranged in an ascending order, where K is a positive integer.

In some implementations, identifying the first free space includes identifying a $k^{th}$ free space of the one or more free spaces, and in response to determining that a size of the $k^{th}$ free space is larger than or equal to a size of the data, determining the $k^{th}$ free space as the first free space. Here, k is an integer that satisfies $1 \leq k \leq K$. The $k^{th}$ free space is located between a $k^{th}$ address in the second queue and a $k^{th}$ address in the first queue.

In some implementations, identifying the first free space further includes, in response to determining that the size of the $k^{th}$ free space is smaller than the size of the data and that k is less than K, identifying a $(k+1)^{th}$ free space of the one or more free spaces, and in response to determining that a size of the $(k+1)^{th}$ free space is greater than or equal to the size of the data, determining the $(k+1)^{th}$ free space as the first free space. The $(k+1)^{th}$ free space is located between a $(k+1)^{th}$ address in the second queue and a $(k+1)^{th}$ address in the first queue.

In some implementations, identifying the first free space further includes, in response to determining that the size of the $k^{th}$ free space is smaller than the size of the data and that k is equal to K, identifying a starting free space of the one or more free spaces, and in response to determining that a size of the starting free space is greater than or equal to the size of the data, determining the starting free space as the first free space. The starting free space is located between a start address in the second queue and a start address in the first queue.

In some implementations, the start address of the data in the first free space is predetermined.

In some implementations, the method is implemented by a verification system.

In some implementations, the verification system is configured to verify a memory controller.

In some implementations, the method further includes instructing the memory controller to perform a read operation on the data in the memory space, and comparing a result of the read operation performed by the memory controller and a result generated by the verification system.

In some implementations, the method further includes instructing a memory controller to perform a program operation to store data in the memory space, and comparing a result of the program operation performed by the memory controller and a result generated by the verification system.

In some implementations, the verification system is a universal verification methodology (UVM) system configured to execute a memory allocation policy.

One aspect of the present disclosure features a verification system. The verification system includes one or more processors and one or more memories storing one or more instructions for execution by the one or more processors to perform operations including receiving data to be stored in a memory space that includes one or more free spaces. The operations further include identifying a first free space of the one or more free spaces based on a first queue and a second queue. The first queue includes one or more addresses corresponding to end addresses of the one or more free space, and the second queue includes one or more addresses corresponding to start addresses of the one or more free spaces. The operations further include storing the data in the first free space, adding to the first queue an address corresponding to a start address of the first free space, and adding to the second queue an address corresponding to an end address of the first free space.

In some implementations, the first queue includes an end address of the memory space, and the second queue includes a start address of the memory space.

In some implementations, the first queue and the second queue each include K addresses arranged in an ascending order, where K is a positive integer.

In some implementations, identifying the first free space includes identifying a $k^{th}$ free space of the one or more free spaces, and in response to determining that a size of the $k^{th}$ free space is larger than or equal to a size of the data, determining the $k^{th}$ free space as the first free space. Here, k is an integer that satisfies $1 \leq k \leq K$. The $k^{th}$ free space is located between a $k^{th}$ address in the second queue and a $k^{th}$ address in the first queue.

In some implementations, identifying the first free space further includes, in response to determining that the size of the $k^{th}$ free space is smaller than the size of the data and that k is less than K, identifying a $(k+1)^{th}$ free space of the one or more free spaces, and in response to determining that a size of the $(k+1)^{th}$ free space is greater than or equal to the size of the data, determining the $(k+1)^{th}$ free space as the first free space. The $(k+1)^{th}$ free space is located between a $(k+1)^{th}$ address in the second queue and a $(k+1)^{th}$ address in the first queue.

In some implementations, identifying the first free space further includes, in response to determining that the size of the $k^{th}$ free space is smaller than the size of the data and that k is equal to K, identifying a starting free space of the one or more free spaces, and in response to determining that a size of the starting free space is greater than or equal to the size of the data, determining the starting free space as the first free space. The starting free space is located between a start address in the second queue and a start address in the first queue.

In some implementations, the verification system is universal verification methodology (UVM) system configured to execute a memory allocation policy.

One aspect of the present disclosure features a non-transitory, computer readable medium. The non-transitory, computer readable medium stores one or more instructions executable by a computer system to perform operations to perform operations including receiving data to be stored in a memory space that includes one or more free spaces. The operations further include identifying a first free space of the one or more free spaces based on a first queue and a second queue. The first queue includes one or more addresses corresponding to end addresses of the one or more free space, and the second queue includes one or more addresses corresponding to start addresses of the one or more free spaces. The operations further include storing the data in the first free space, adding to the first queue an address corresponding to a start address of the first free space, and adding to the second queue an address corresponding to an end address of the first free space.

While generally described as computer-implemented software embodied on tangible media that processes and transforms the respective data, some or all of the aspects may be computer-implemented methods or further included in respective systems or other devices for performing this described functionality. The details of these and other aspects and implementations of the present disclosure are set forth in the accompanying drawings and the description below. Other features, objects, and advantages of the disclosure will be apparent from the description and drawings, and from the claims.

BRIEF DESCRIPTION OF DRAWINGS

Like reference numbers and designations in the various drawings indicate like elements.

DETAILED DESCRIPTION

Figure 1:
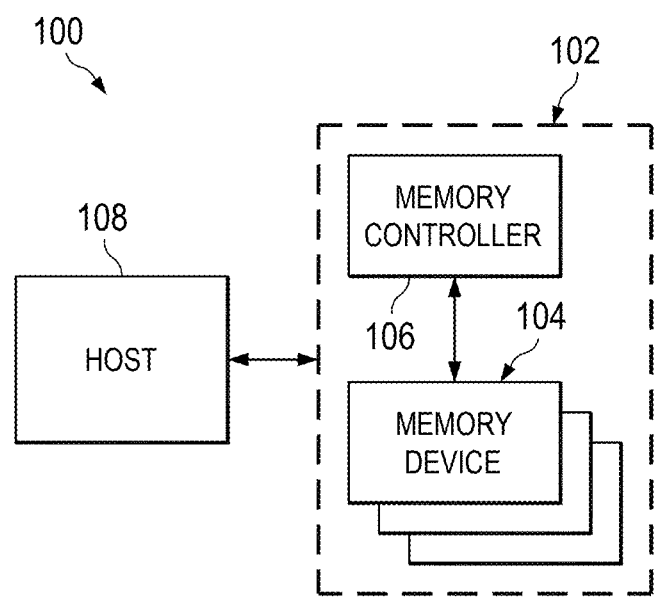
FIG. 1 illustrates a block diagram of an example system having a memory device, according to some aspects of the present disclosure.

A verification system can test a designed circuit or a manufactured device during a development process of a memory chip. In some cases, when testing a circuit or a device (e.g., a memory controller) by a verification system, a memory space of the verification system needs to be allocated to store data (e.g., test data), so that the circuit or device being tested can perform operations on the data. The process of allocating the memory space can be time-consuming, which can affect the overall efficiency of the verification system.

In some implementations, the verification system can be designed in accordance with Universal Verification Methodology (UVM). The verification system can include a memory allocation manager that implements a memory allocation policy. In some cases, for each piece of data to be stored in the memory space, a memory allocation policy is implemented to instruct a memory allocation manager to randomly select an address within the memory space. The address is randomly selected regardless of whether a sub-space starting with the address is free or occupied. If the sub-space cannot store the piece of data, the memory allocation manager randomly selects another address within the memory space, until finding a sub-space of the memory space that can store the piece of data. As such, the process of allocating the memory space may take a long time. For example, the time needed to allocate the memory space may increase exponentially with the increase of the volume of the data to be stored in the memory space.

The present disclosure provides techniques for allocating memory spaces in a more efficient way. In some implementations, for each piece of data to be stored in a memory space, a memory allocation policy can be implemented to instruct a memory allocation manager to identify a free space of the memory space. If the free space cannot store the piece of data (e.g., the size of the free space is smaller than the size of the data, or aligning requirements of the data are not satisfied), the memory allocation manager can identify another free space of the memory space, until finding one of the free spaces that can store the piece of data. Free spaces of the memory space can be identified based on two queues. For example, a first queue can include start addresses of occupied spaces of the memory space, and a second queue can include end addresses of the occupied spaces. Addresses in the first and the second queue can thereby indicate free spaces in the memory space. As such, the process of allocating the memory space can be more time efficient. For example, the time needed to allocate the memory space may increase linearly with the increase of the volume of the data to be stored in the memory space. Tests based on a more efficient allocation of memory spaces can be more efficient, which allows the verification system to test more complex designs in a more time efficient manner.

The above aspects and some other aspects of the present disclosure are discussed in greater detail below.

FIG. 1 illustrates a block diagram of an example system 100 having a memory device, according to some aspects of the present disclosure. The system 100 can be a mobile phone, a desktop computer, a laptop computer, a tablet, a vehicle computer, a gaming console, a printer, a positioning device, a wearable electronic device, a smart sensor, a virtual reality (VR) device, an argument reality (AR) device, or any other suitable electronic devices having storage therein. As shown in FIG. 1, the system 100 can include a host 108 and a memory system 102 having one or more memory devices 104 and a memory controller 106. The host 108 can include one or more processors of an electronic device. The processor can be a central processing unit (CPU), or a system-on-chip (SoC), such as an application processor (AP). The host 108 can be configured to send or receive data and commands to or from the memory systems 102.

The memory device 104 can be any memory device disclosed in the present disclosure, such as a NAND Flash memory device. It is noted that the NAND Flash is only one example of memory device for illustrative purposes. It can include any suitable solid-state, non-volatile memory, e.g., NOR Flash, Ferroelectric RAM (FeRAM), Phase-change memory (PCM), Magne-to-resistive random-access memory (MRAM), Spin-transfer torque magnetic random-access memory (STT-RAM), or Resistive random-access memory (RRAM), etc. In some implementations, memory device 104 includes a three-dimensional (3D) NAND Flash memory device.

The memory controller 106 can be implemented by microprocessors, microcontrollers (a.k.a. microcontroller units (MCUs)), digital signal processors (DSPs), application-specific integrated circuits (ASICs), field-programmable gate arrays (FPGAs), programmable logic devices (PLDs), state machines, gated logic, discrete hardware circuits, and other suitable hardware, firmware, and/or software configured to perform the various functions described below in detail.

The memory controller 106 is coupled to the memory device 104 and to the host 108, and is configured to control the memory device 104, according to some implementations. The memory controller 106 can manage the data stored in the memory device 104 and can communicate with the host 108. In some implementations, the memory controller 106 is designed for operating in a low duty-cycle environment, such as secure digital (SD) cards, compact Flash (CF) cards, universal serial bus (USB) Flash drives, or other media for use in electronic devices, such as personal computers, digital cameras, mobile phones, etc. In some implementations, memory controller 106 is designed for operating in a high duty-cycle environment solid state drives (SSDs) or embedded multi-media-cards (eMMCs) used as data storage for mobile devices, such as smartphones, tablets, laptop computers, etc., and enterprise storage arrays. The memory controller 106 can be configured to control operations of the memory device 104, such as read, erase, and program operations. The memory controller 106 can also be configured to manage various functions with respect to the data stored or to be stored in the memory device 104 including, but not limited to bad-block management, garbage collection, logical-to-physical address conversion, logical-to-physical mapping management, wear leveling, etc. In some implementations, the memory controller 106 is further configured to process error correction codes (ECCs) with respect to the data read from or written to the memory device 104. Any other suitable functions can be performed by the memory controller 106 as well, for example, formatting the memory device 104.

The memory controller 106 can communicate with an external device (e.g., the host 108) according to a particular communication protocol. For example, the memory controller 106 can communicate with the external device through at least one of various interface protocols, such as a USB protocol, an MMC protocol, a peripheral component interconnection (PCI) protocol, a PCI-express (PCI-E) protocol, an advanced technology attachment (ATA) protocol, a serial-ATA protocol, a parallel-ATA protocol, a small computer small interface (SCSI) protocol, an enhanced small disk interface (ESDI) protocol, an integrated drive electronics (IDE) protocol, a Firewire protocol, etc. The memory controller 106 is configured to receive and transmit a command to and from the host 108, and execute or perform multiple functions and operations provided in the present disclosure, which will be described later.

Figure 2A:
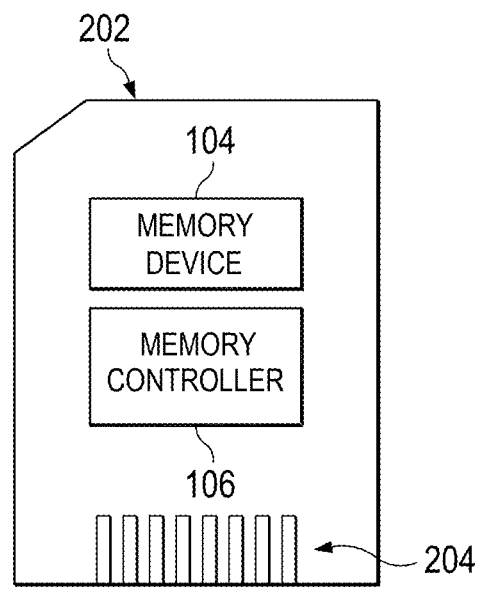
FIGS. 2A-2B illustrate example storage products, according to some aspects of the present disclosure.
Figure 2B:
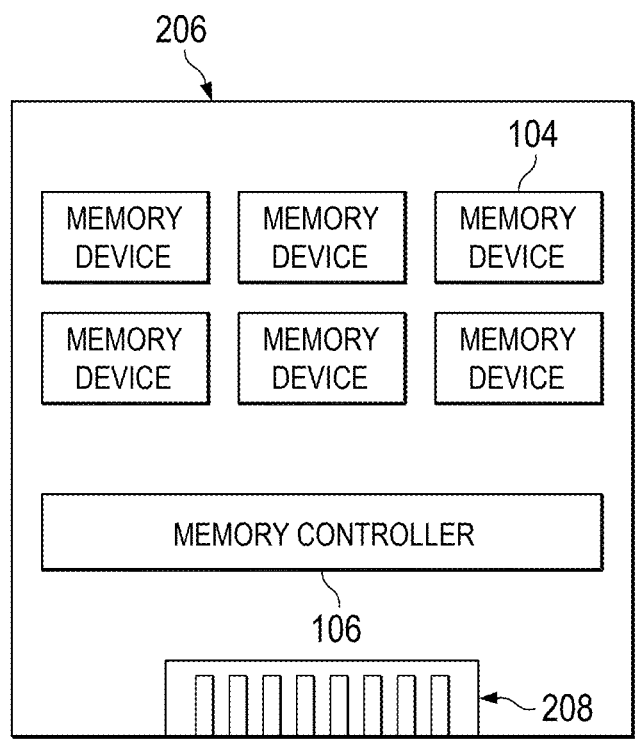

The memory controller 106 and the one or more memory devices 104 can be integrated into various types of storage devices. For example, the memory controller 106 and the one or more memory devices 104 can be packaged in a universal Flash storage (UFS) package or an eMMC package. In one example as shown in FIG. 2A, the memory controller 106 and a single memory device 104 can be integrated into a memory card 202. The memory card 202 can include a PC card (PCMCIA, personal computer memory card international association), a CF card, a smart media (SM) card, a memory stick, a multimedia card (MMC, RS-MMC, MMCmicro), an SD card (SD, miniSD, microSD, SDHC), a UFS, etc. The memory card 202 can further include a memory card connector 204 coupling the memory card 202 with a host (e.g., host 108 in FIG. 1). In another example as shown in FIG. 2B, the memory controller 106 and multiple memory devices 104 can be integrated into an SSD 206. The SSD 206 can further include an SSD connector 208 that couples the SSD 206 with a host (e.g., host 108 in FIG. 1). In some implementations, the storage capacity and/or the operation speed of the SSD 206 is greater than those of the memory card 202.

Figure 3:
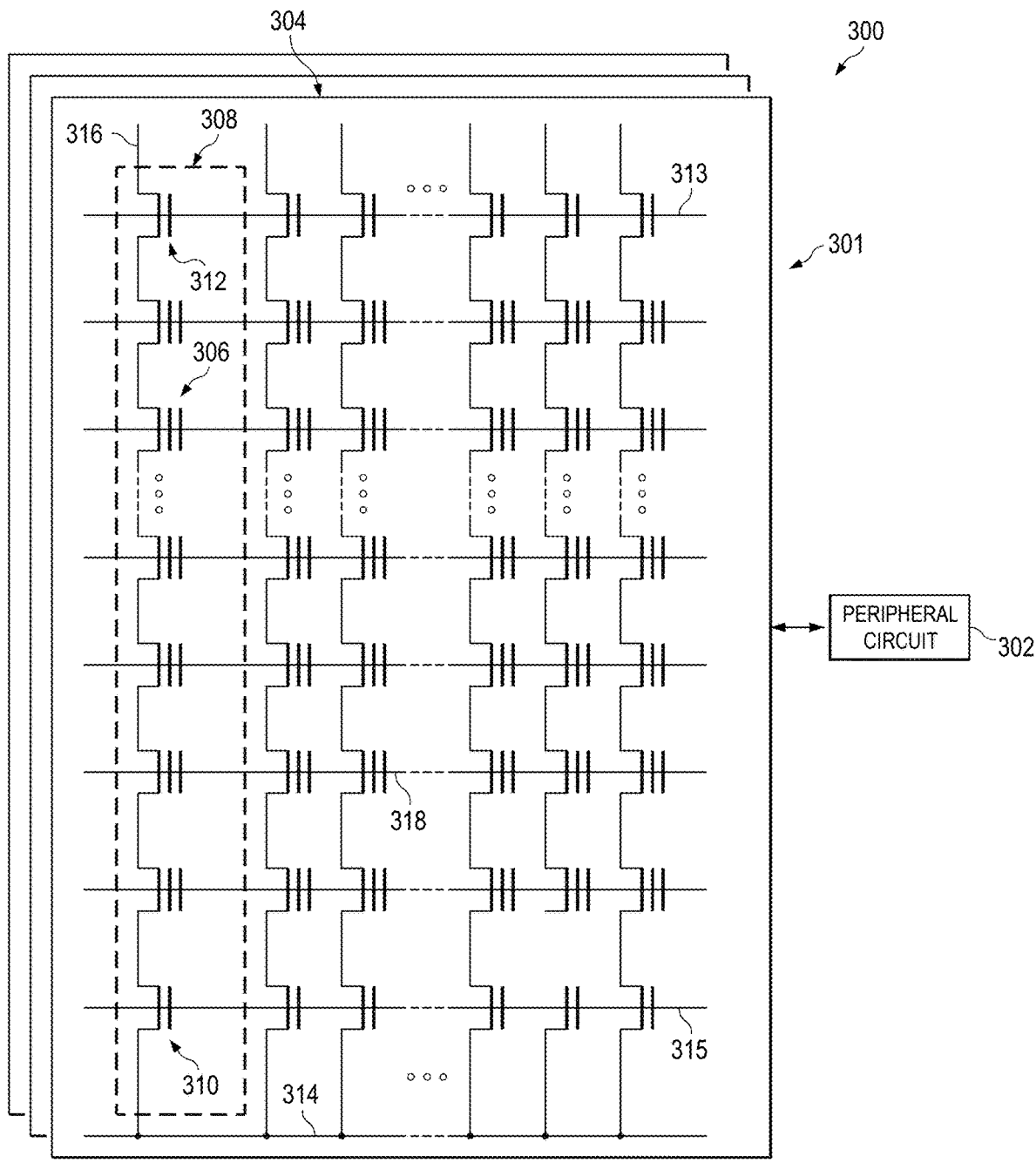
FIG. 3 illustrates an example of a schematic diagram of a memory device including peripheral circuits, according to some aspects of the present disclosure.

FIG. 3 illustrates an example of a schematic diagram of a memory device 300 including peripheral circuits, according to some aspects of the present disclosure. The memory device 300 can include a memory cell array 301 and peripheral circuits 302 coupled to the memory cell array 301. The memory cell array 301 can be a NAND Flash memory cell array in which memory cells 306 are provided in the form of an array of NAND memory strings 308 each extending vertically above a substrate (not shown in FIG. 3). In some implementations, each NAND memory string 308 includes a plurality of memory cells 306 coupled in series and stacked vertically. Each memory cell 306 can hold a continuous, analog value, such as an electrical voltage or charge that depends on the number of electrons trapped within a storage layer of the memory cell 306. The logic state (i.e., data) of each memory cell 306 in a memory block 304 can be determined based on the threshold voltage Vth of the memory cell 306. Each memory cell 306 can be a floating gate type memory cell including a floating-gate transistor, or a charge trap type memory cell including a charge-trap transistor.

In some implementations, each memory cell 306 is a single-level cell (SLC) with two possible memory states that can store one bit of data. For example, the first memory state "0" can correspond to a first range of voltages, and the second memory state "1" can correspond to a second range of voltages. In some implementations, each memory cell 306 is a multi-level cell (MLC) that is capable of storing more than one bit of data in more than two memory states. For example, the MLC can store two bits per cell, three bits per cell (also known as triple-level cell (TLC)), or four bits per cell (also known as a quad-level cell (QLC)). Each MLC can be programmed to support a range of possible nominal storage values. In one example, if each MLC stores two bits of data, then the MLC can be programmed to one of three possible programming levels from an erased state by writing one of three possible nominal storage values to the cell. A fourth nominal storage value can be used for the erased state.

As shown in FIG. 3, each NAND memory string 308 can include a source select gate (SSG) 310 at its source end and a drain select gate (DSG) 312 at its drain end. The SSG 310 and the DSG 312 can be configured to activate selected NAND memory strings 308 (columns of the array) during read and program operations. In some implementations, the sources of NAND memory strings 308 in the same memory block 304 are coupled through a same source line (SL) 314, e.g., a common SL. In other words, NAND memory strings 308 in the same memory block 304 have an array common source (ACS), according to some implementations. The DSG 312 of each NAND memory string 308 is coupled to a respective bit line 316 from which data can be read or written via an output bus (not shown), according to some implementations. In some implementations, each NAND memory string 308 is configured to be selected or deselected by applying a select voltage (e.g., above the threshold voltage of the transistor having the DSG 312) or a deselect voltage (e.g., 0 V) to the respective DSG 312 through one or more DSG lines 313, and/or by applying a select voltage (e.g., above the threshold voltage of the transistor having the SSG 310) or a deselect voltage (e.g., 0 V) to the respective SSG 310 through one or more SSG lines 315.

As shown in FIG. 3, NAND memory strings 308 can be organized into multiple memory blocks 304, each of which can have a common SL 314 coupled to the ACS. In some implementations, each memory block 304 can serve as a basic data unit for erase operations, such that memory cells 306 on the same memory block 304 are erased at the same time. To erase memory cells 306 in a selected memory block 304, the SL 314 coupled to the selected memory block 304 and unselected memory blocks in the same plane can be biased with an erase voltage. For example, the erase voltage can be a high positive voltage (e.g., 20 V or more). In some implementations, an erase operation can be performed at a half-block level, a quarter-block level, or a level having any suitable number of memory blocks or fractions of a memory block.

The memory cells 306 of adjacent NAND memory strings 308 can be coupled through word lines 318. The word line 318 can select which row of memory cells 306 is affected by read and program operations. Each word line 318 can include a gate line coupled to a plurality of control gates (gate electrodes) of a plurality of memory cells 306. Example word lines shown in FIG. 3 are between one or more DSG lines 313 and one or more SSG lines 315.

Figure 4:
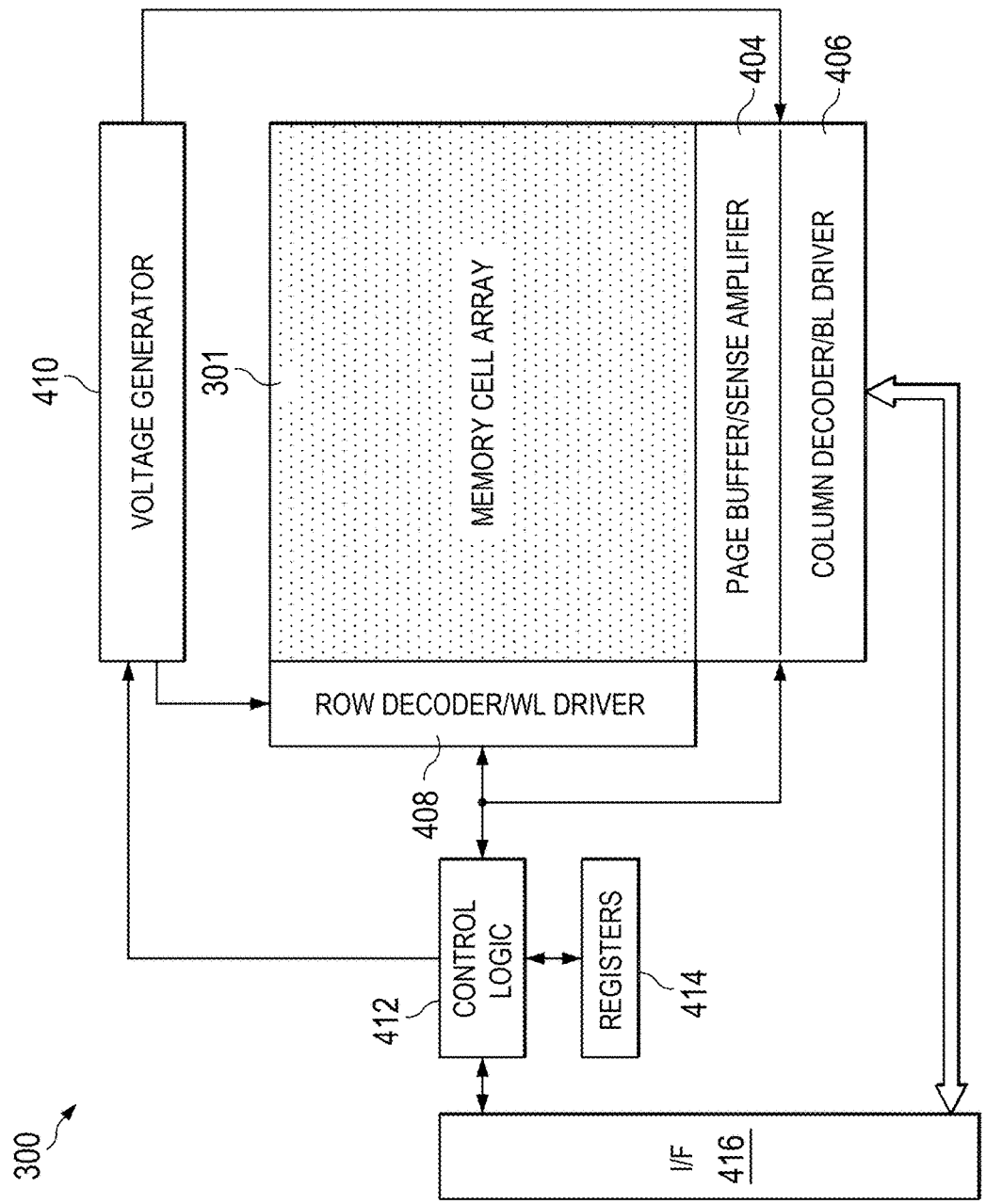
FIG. 4 illustrates some example peripheral circuits, according to some aspects of the present disclosure.

FIG. 4 illustrates some example peripheral circuits 302, according to some aspects of the present disclosure. The peripheral circuits 302 can be coupled to the memory cell array 301 through bit lines 316, word lines 318, SLs 314, SSG lines 315, and DSG lines 313. The peripheral circuits 302 can include any suitable analog, digital, and mixed-signal circuits for facilitating the operations of the memory cell array 301 by applying and sensing voltage signals and/or current signals to and from each target memory cell 306 through bit lines 316, word lines 318, SLs 314, SSG lines 315, and DSG lines 313. The peripheral circuits 302 can include various types of peripheral circuits formed using metal-oxide-semiconductor (MOS) technologies. The example peripheral circuits 302 include a page buffer/sense amplifier 404, a column decoder/bit line driver 406, a row decoder/word line driver 408, a voltage generator 410, control logic 412, registers 414, an interface 416, and a data bus. In some examples, additional peripheral circuits not shown in FIG. 4 may be included as well.

The page buffer/sense amplifier 404 can be configured to read and program (write) data from and to memory cell array 301 according to the control signals from control logic 412. In an example, the page buffer/sense amplifier 404 may store one page of program data (write data) to be programmed into one page 320 of the memory cell array 301. In another example, the page buffer/sense amplifier 404 may perform program verify operations to ensure that the data have been properly programmed into memory cells 306 coupled to selected word lines 418. In still another example, the page buffer/sense amplifier 404 may also sense the low power signals from the bit line 316 that represents a data bit stored in memory cell 306, and amplify the small voltage swing to recognizable logic levels in a read operation. The column decoder/bit line driver 406 can be configured to be controlled by the control logic 412 and select one or more NAND memory strings 308 by applying bit line voltages generated from the voltage generator 410.

The row decoder/word line driver 408 can be configured to be controlled by the control logic 412 and select/deselect memory blocks 304 of the memory cell array 301 and select/deselect word lines 418 of the memory block 304. The row decoder/word line driver 408 can be further configured to drive word lines 418 using word line voltages generated from the voltage generator 410. In some implementations, the row decoder/word line driver 408 can also select/ deselect and drive SSG lines 415 and DSG lines 413. As described below in detail, the row decoder/word line driver 408 is configured to apply a program voltage to selected word line 418 in a program operation on memory cell 306 coupled to selected word line 418.

The voltage generator 410 can be configured to be controlled by the control logic 412 and generate the word line voltages (e.g., read voltage, program voltage, pass voltage, local voltage, verify voltage, etc.), bit line voltages, and source line voltages to be supplied to the memory cell array 301.

The control logic 412 can be coupled to each peripheral circuit described above and configured to control operations of each peripheral circuit. The registers 414 can be coupled to the control logic 412 and include status registers, command registers, and address registers for storing status information, command operation codes (OP codes), and command addresses for controlling the operations of each peripheral circuit.

The interface 416 can be coupled to the control logic 412 and act as a control buffer to buffer and relay control commands received from a host (not shown) to the control logic 412 and status information received from the control logic 412 to the host. The interface 416 can also be coupled to the column decoder/bit line driver 406 via a data bus, and act as a data input/output (I/O) interface and a data buffer to buffer and relay data to and from the memory cell array 301.

Figure 5:
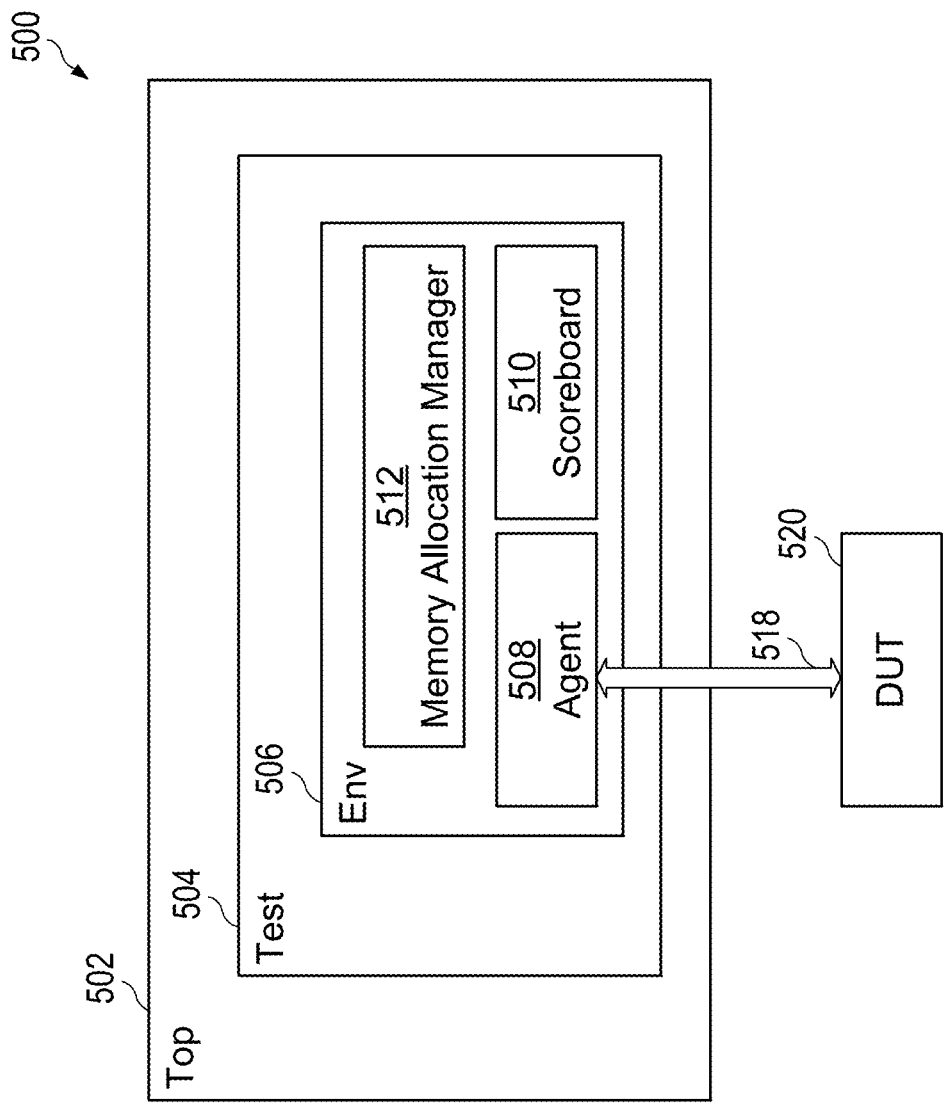
FIG. 5 illustrates a schematic diagram of an example verification system, according to some aspects of the present disclosure.

FIG. 5 illustrates a schematic diagram of an example verification system 500, according to some aspects of the present disclosure. In some implementations, the verification system 500 can be designed in accordance with one of the standardized Universal Verification Methodology (UVM), Open Verification Methodology (OVM) or Advanced Verification Methodology (AVM).

As shown in FIG. 5, the verification system 500 is configured to verify functions and performances of a device under test (DUT) 520. In some implementations, the DUT 520 can be a device or an integrated circuit design of a memory system (e.g., the memory system 102 of FIG. 1), a memory device (e.g., the memory device 104 of FIG. 1), or a memory controller (e.g., the memory controller 106 of FIG. 1). For example, the verification system 500 can verify error correction functions, encoding and decoding functions, power management functions, etc., of a memory controller.

In some implementations, the verification system 500 designed in accordance with UVM ("UVM system") can include multiple levels of configuration structures arranged in a hierarchical order, including a top testbench 502 (e.g., uvm_top component in UVM system), a test case 504 (e.g., uvm_test component in UMV system) and an environment 506 (e.g., uvm_env component in UVM system). In some implementations, the top testbench 502 is a top-level configuration structure that is not open for user customization. The top testbench 502 can manage and coordinate components across the entire testbench to ensure different phases (e.g., build phase, connect phase, and run phase) of a verification process are executed in the proper order. For example, the top testbench can manage the initialization, connection, and execution of components such as environments 506, agents 508, scoreboards 510, and memory allocation manager 512.

In some implementations, the test case 504 is a user-customized configuration structure configured to verify the DUT 520. For example, the test case 504 can generate different stimuli (aka., transactions), apply the stimuli to the DUT 520, and monitor the output results of the DUT 520. The output results are compared with expected results to verify performances of the DUT 520. The test case 504 can include a sequence (not shown) and an environment 506, among others. The sequence can generate or store stimuli to be applied to the DUT 520.

The environment 506 can include a reference model (not shown), a scoreboard 510, a virtual sequencer (not shown), one or more agents 508, a register/memory model (not shown), and a memory allocation manager 512.

The reference model can receive the same stimuli as the DUT 520 and generate expected results for an operation performed by the DUT 520. The expected results generated by the reference model is sent to the scoreboard 510, where the output results of the DUT 520 is compared with the expected results.

The scoreboard 510 can receive the expected results generated by the reference model, and compare the output results from the DUT 520 with the expected results. As such, the verification system 500 can verify an operation performed by the DUT 520, e.g., whether the DUT 520 can perform the operation correctly.

The virtual sequencer can receive the stimuli generated by the sequence, and send the stimuli to corresponding agents 508.

The agent 508 can receive the stimuli from the virtual sequencer, and apply the stimuli to the DUT 520. The agent 508 can communicate with the DUT 520 through an interface 518. The agent 508 can include components such as a driver and a monitor. In some implementations, an agent 508 can correspond to a physical interface protocol. The physical interface protocol dictates the format and method of data exchange between the DUT 520 and drivers or monitors of the agent 508. The environment 506 can include more than one agent 508, such as a bus agent, an input agent (e.g., in_agent component of UVM system), and an output agent (e.g., out_agent component of UVM system). In some implementations, a driver (e.g., uvm_driver component of UVM system) of the agent 508 can receive stimuli from the virtual sequencer, parse the stimuli, and apply the stimuli to the DUT 520 through the interface 518. In some implementations, a monitor of the agent 508 can receive responses from the DUT 520 through the interface 518, and convert the responses into output results to be processed by the scoreboard 510.

The register/memory model can be used to model registers or memories of the DUT 520, so that the DUT 520 does not have to have a built-in register or memory. The register/memory model allows front-door operations (e.g., accessing through the DUT's standard interfaces and protocols) and back-door operations (e.g., accessing directly, without going through the DUT's standard interfaces and protocols). In some implementations, when the DUT 520 is a memory controller, the register/memory model can be used to model a memory device coupled to and controlled by the memory controller.

The memory allocation manager 512 (e.g., uvm_mem_man component in UVM system) can be used to manage the register/memory model, e.g., how a memory space in the register/memory model is allocated when storing data. The memory allocation manager can execute a memory allocation policy (e.g., uvm_mem_alloc_policy of UVM system). In some implementations, when new data need to be stored in the memory space of the register/memory model, a memory allocation policy can be implemented to instruct the memory allocation manager 512 to identify a free space of the memory space, and check whether the free space can store the new data. If the free space cannot store the new data, a next free space can be identified and checked, until the new data is stored in one of the free spaces. Free spaces can be identified based on two queues that include addresses indicating free spaces in the memory space, as explained in more detail below with reference to FIGS. 6A-6B and 7.

In some implementations, the verification system 500 is configured to verify a DUT 520 that is a memory controller. The sequence of the test case 504 can generate stimuli of a read operation or a write operation. The register/memory model of the environment 506 can model a memory device (e.g., the memory device 104 of FIG. 1-2B) controlled by the memory controller. Output results of the DUT 520 from performing the read operation or the write operation are sent to the scoreboard 510 to be compared with expected results generated by the reference model. In some implementations, by deliberately (e.g., through back-end operations) introducing errors into data in the memory/register model, the verification system 500 can verify error correction functions of the memory controller, e.g., whether the memory controller can correctly identify and correct the introduced errors.

Figure 6A:
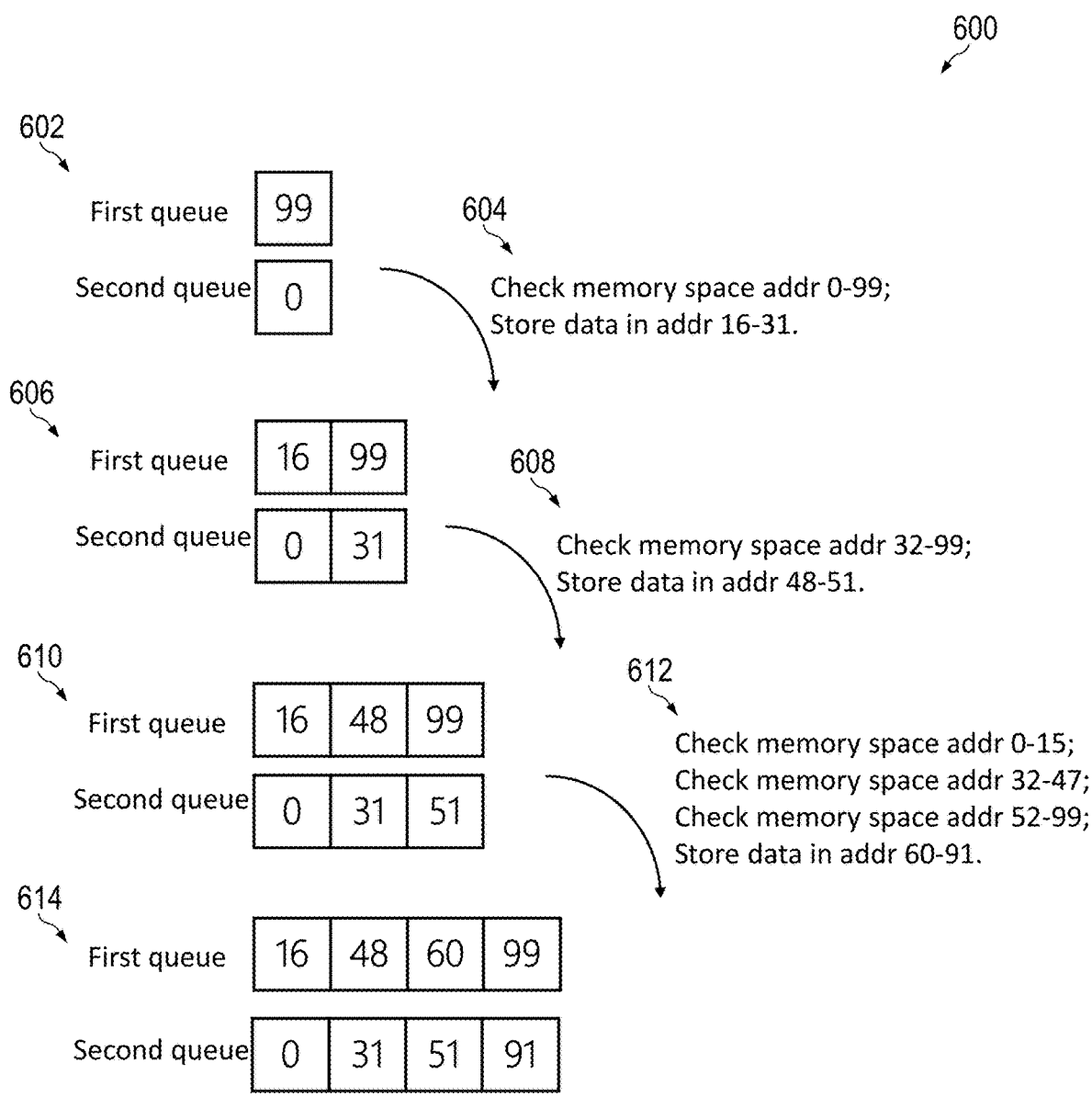
FIGS. 6A-6B illustrates example processes of allocating a memory space based on two queues, according to some aspects of the present disclosure.

FIG. 6A illustrates an example process 600 of allocating a memory space based on two queues, according to some aspects of the present disclosure. In some implementations, a first queue stores start addresses of occupied spaces in a memory space. A second queue stores end addresses of occupied spaces in the memory space. As an example, the memory space can be represented by a total of 100 consecutive addresses (e.g., addresses 0-99).

Before operation 602, the memory space is not occupied by any data. For example, the memory space with addresses 0-99 is free and not occupied by data.

At operation 602, the first queue and the second queue are initialized by adding an end address of the memory space to the first queue, and adding a start address of the memory space to the second queue. For example, the end address 99 is added to the first queue, and the start address 0 is added to the second queue. As such, the first queue and the second queue each have one address, which can indicate one free space with addresses 0-99.

At operation 604, after receiving first data, a free space indicated by the first queue and the second queue is checked as to whether it can store the first data. In some implementations, the free space can store the data based on conditions including: a length of the free space is greater or equal to the length of data, the start address of the data satisfies aligning requirements such as byte alignment requirements, among others. For example, the first data has a length of 16, and the byte alignment requirements require that start address of the first data needs to be a multiple of 4. The free space with addresses 0-99 is checked. Since the free space with address 0-99 is able to store the first data, the first data can be stored in a subspace (e.g., a subspace with addresses 16-31) of the free space.

At operation 606, the start address of the first data is added to the first queue, and the end address of the first data is added to the second queue. In some implementations, addresses in the first queue and the second queue are both arranged in an ascending order. For example, the start address 16 of the first data is added to the first queue before address 99, and the end address 31 of the first data is added to the second queue following address 0. As such, the first queue and the second queue each have two addresses, which can indicate two free spaces with addresses 0-15 and addresses 32-99, respectively.

At operation 608, after receiving second data, a free space indicated by the first queue and the second queue is checked as to whether it can store the second data. In some implementations, the first free space (e.g., the free space indicated by the first address in the first queue and the first address in the second queue) is checked first. In other implementations, a random free space (e.g., the free space indicated by the $k^{th}$ address in the first queue and the $k^{th}$ address in the second queue, where k is a randomly picked integer from 1 to K, and K is the number of addresses in the first queue or the second queue) is checked first. For example, the second data has a length of 4, and the start address of the second data needs to be a multiple of 4 according to byte alignment requirements. The free space with addresses 32-99 is checked. Since the free space with addresses 32-99 is able to store the second data, the second data can be stored in a subspace (e.g., a subspace with addresses 48-51) of the free space.

At operation 610, the start address of the second data is added to the first queue, and the end address of the second data is added to the second queue. For example, the start address 48 of the second data is added to the first queue between address 16 and address 99, and the end address 51 of the second data is added to the second queue following address 31. As such, the first queue and the second queue each have three addresses, which can indicate three free spaces with addresses 0-15, addresses 32-47 and addresses 52-99, respectively.

At operation 612, after receiving third data, a free space indicated by the first queue and the second queue is checked as to whether it can store the third data. If the free space cannot store the third data, a next free space as indicated by the first queue and the second queue is checked. For example, the third data has a length of 32, and the start address of the third data needs to be a multiple of 4 according to byte alignment requirements. First, the free space with addresses 0-15 is checked. Since it cannot store the third data, the next free space with addresses 32-47 is checked. Since it cannot store the third data either, the next free space with addresses 52-99 is checked. Since the free space with address 52-99 is able to store the third data, the third data can be stored in a subspace (e.g., a subspace with address 60-91) of the free space.

At operation 614, the start address of the third data is added to the first queue, and the end address of the third data is added to the second queue. For example, the start address 48 of the third data is added to the first queue between 16 and 60, and the end address 91 of the third data is added to the second queue after address 51. As such, the first queue and the second queue each have four addresses, which can indicate four free spaces with addresses 0-15, addresses 32-47, addresses 52-59 and addresses 92-99, respectively.

The process 600 can continue with similar operations to store fourth, fifth and more data in the memory space based on the first queue and a second queue, without further elaboration.

Figure 6B:
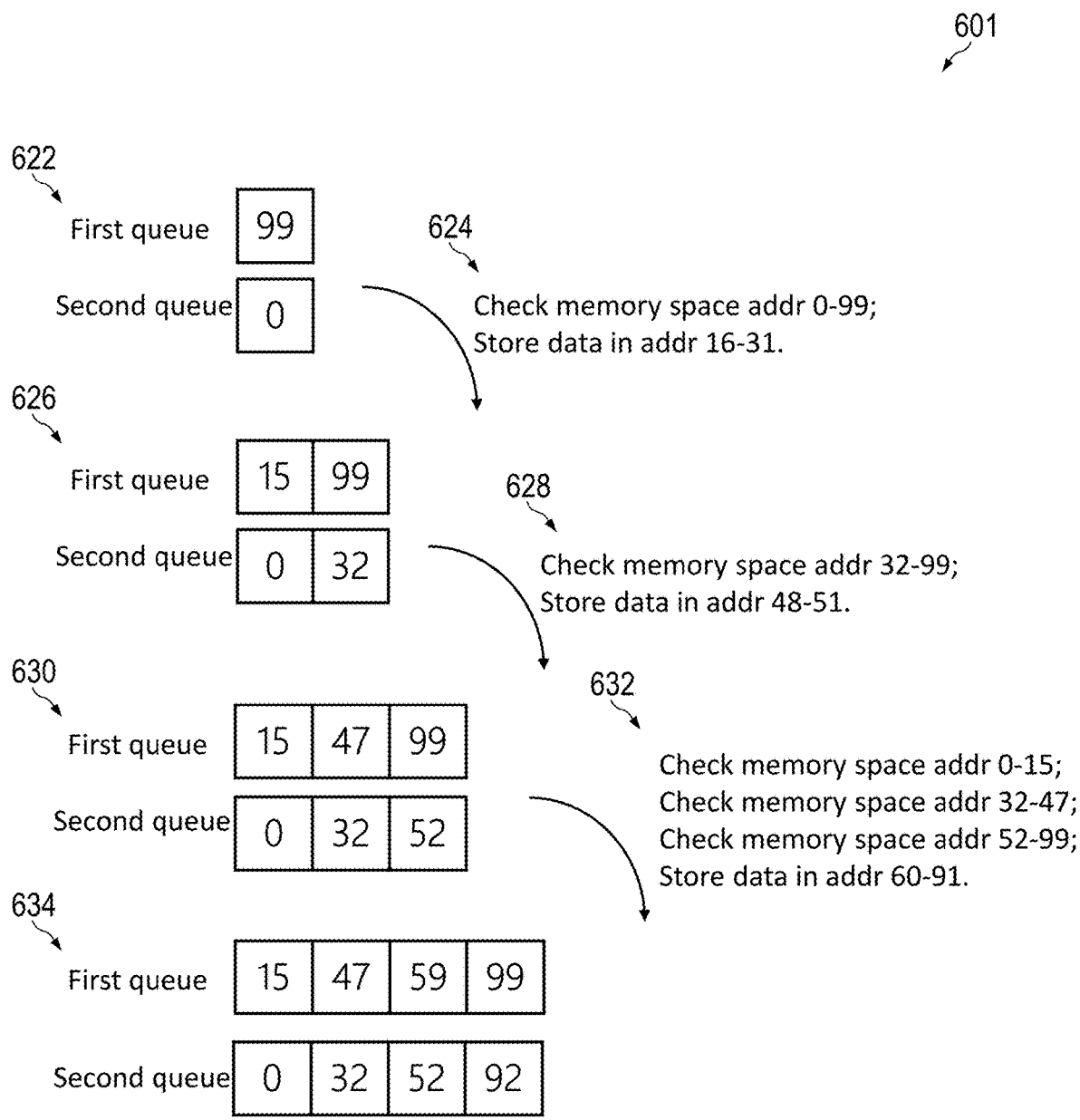

FIG. 6B illustrates an example process 601 of allocating a memory space based on two queues, according to some aspects of the present disclosure. In some implementations, a first queue stores end addresses of free spaces in a memory space. A second queue stores start addresses of free spaces in the memory space. As an example, the memory space can be represented by a total of 100 consecutive addresses (e.g., addresses 0-99).

Before operation 622, the memory space is not occupied by any data. For example, the memory space with addresses 0-99 is free and not occupied by data.

At operation 622, similar to operation 602 of FIG. 6A, the first queue and the second queue are initialized by adding an end address of the memory space to the first queue, and adding a start address of the memory space to the second queue. For example, the end address 99 is added to the first queue, and the start address 0 is added to the second queue. As such, the first queue and the second queue each have one address, which can indicate one free space with addresses 0-99.

At operation 624, similar to operation 604 of FIG. 6A, after receiving first data, a free space indicated by the first queue and the second queue is checked as to whether it can store the first data. For example, the first data has a length of 16, and the start address of the first data needs to be a multiple of 4 according to byte alignment requirements. Since the free space with addresses 0-99 is able to store the first data, the first data can be stored in a subspace (e.g., a subspace with addresses 16-31) of the free space.

At operation 626, an address immediately before the start address of the first data (e.g., end address of a first free space in the memory space) is added to the first queue, and an address immediately following the end address of the first data (e.g., start address of a second free space in the memory space) is added to the second queue. In some implementations, addresses in the first queue and the second queue are both arranged in an ascending order. For example, address 15 is added to the first queue before address 99, and address 32 is added to the second queue following address 0. As such, the first queue and the second queue each have two addresses, which can indicate two free spaces with address 0-15 and address 32-99, respectively.

At operation 628, similar to operation 608 of FIG. 6A, after receiving second data, a free space indicated by the first queue and the second queue is checked as to whether it can store the second data. For example, the second data has a length of 4, and the start address of the second data needs to be a multiple of 4 according to byte alignment requirements. The free space with addresses 32-99 is checked. The second data can be stored in a subspace (e.g., a subspace with addresses 48-51) of the free space.

At operation 630, an address immediately before the start address of the second data (e.g., end address of a second free space in the memory space) is added to the first queue, and an address immediately following the end address of the second data (e.g., start address of a third free space in the memory space) is added to the second queue. For example, address 47 is added to the first queue between 15 and 99, and address 52 is added to the second queue after 32. As such, the first queue and the second queue each have three addresses, which can indicate three free spaces with addresses 0-15, addresses 32-47 and addresses 52-99, respectively.

At operation 632, similar to operation 612 of FIG. 6A, after receiving third data, a free space indicated by the first queue and the second queue is checked as to whether the third data can be stored. If the free space cannot store the third data, a next free space as indicated by the first queue and the second queue is checked. For example, the third data has a length of 32, and the start address of the third data needs to be a multiple of 4 according to byte alignment requirements. Free spaces with addresses 0-15, 32-47 and 52-99 are checked respectively. The third data can be stored in a subspace (e.g., a subspace with addresses 60-91) of the free space with addresses 52-99.

At operation 634, an address immediately before the start address of the third data (e.g., end address of a third free space in the memory space) is added to the first queue, and an address immediately following the end address of the third data (e.g., start address of a fourth free space in the memory space) is added to the second queue. For example, address 59 is added to the first queue between address 47 and 99, and address 92 is added to the second queue after address 52. As such, the first queue and the second queue each have four addresses, which can indicate four free spaces with addresses 0-15, addresses 32-47, addresses 52-59 and addresses 92-99, respectively.

The process 601 can continue with similar operations to store fourth, fifth and more data in the memory space based on the first queue and a second queue, without further elaboration.

In some implementations, the process 600 or 601 can be implemented by a memory allocation manager (e.g., memory allocation manager 512 of FIG. 5) of a verification system (e.g., a UVM system). For example, a memory allocation policy of a UVM system can instruct the memory allocation manager to implement the process 600 or 601. In some implementations, the process 600 or 601 can be implemented by a memory system (the memory system 102 of FIG. 1), e.g., a flash-translation layer (FTL) of a memory controller (e.g., the memory controller 106 of FIG. 1). For example, the FTL can implement the process 600 or 601 when allocating physical addresses of memory space in a memory device to store data.

Figure 7:
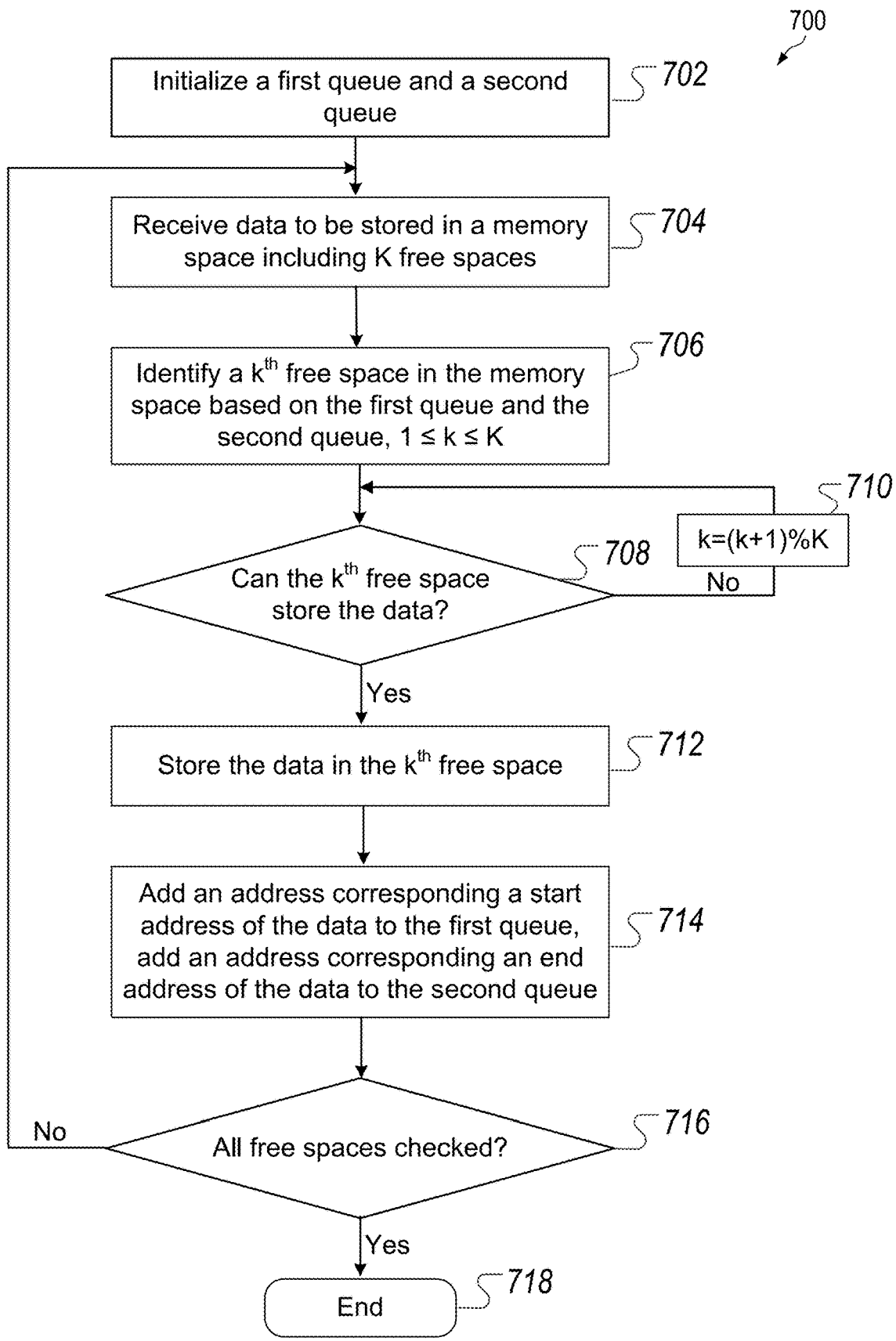
FIG. 7 illustrates a flowchart of an example process of allocating a memory space, in accordance with some aspects of the present disclosure.

FIG. 7 is a flowchart of an example process 700 of allocating a memory space, in accordance with some aspects of the present disclosure. In some implementations, the process 700 can be performed by a memory allocation manager (e.g., memory allocation manager 512 of FIG. 5) of a verification system (e.g., verification system 500 of FIG. 5). In some implementations, the process can be performed by a memory system (e.g., memory system 102 of FIG. 1) that includes a memory device (e.g., memory device 104 of FIG. 1) and a memory controller (e.g., memory controller 106 of FIG. 1). Some or all of the operations in the process 700 can be implemented based on the techniques described in connection with FIGS. 1-6B. The operations shown in the process 700 may not be exhaustive and other operations can be performed as well before, after, or between any of the illustrated operations.

At operation 702, a first queue and a second queue are initialized. The first queue and the second queue can be configured to indicate free spaces in a memory space to be allocated. Initializing the first queue includes storing an end address (e.g. maximum address) of the memory space in the first queue. Initializing the second queue includes storing a start address (e.g., minimum address) of the memory space in the second queue.

At operation 704, data to be stored in the memory space is received. In some implementations, the start address of the data when stored in the memory space needs to satisfy aligning requirements such as byte alignment requirements (e.g., the start address is a multiple of 4, 8, 16, 32, etc.).

At operation 706, a free space (e.g., the $k^{th}$ free space in the memory space) is identified based on the first queue and the second queue. In some implementations, the first queue and the second queue each includes K addresses (K is an integer) arranged in ascending order. For example, as shown in FIG. 6A, other than the last address being the end address of the memory space, addresses in the first queue are start addresses of occupied spaces in the memory space. Other than the first address being the start address of the memory space, addresses in the second queue are end addresses of occupied spaces in the memory space. For another example, as shown in FIG. 6B, other than the last address being the end address of the memory space, addresses in the first queue are end addresses of free spaces in the memory space. Other than the first address being the start address of the memory space, addresses in the second queue are start addresses of free spaces in the memory space.

The first queue and the second queue that each include K addresses can indicate K free spaces in the memory space. In some implementations, a $k^{th}$ address in the first queue and a $k^{th}$ address in the second queue can indicate the $k^{th}$ free space in the memory space ($1 \leq k \leq K$, k is an integer). For example, the $k^{th}$ free space is between the $k^{th}$ address in the second queue and the $k^{th}$ address in the first queue.

At operation 708, the $k^{th}$ free space is determined as to whether it can store the data. If the $k^{th}$ free space can store the data (e.g., if a length of $k^{th}$ free space is larger than or equal to the length of the data, and byte alignment requirements are met), process 700 proceeds to operation 712. If the $k^{th}$ free space cannot store the data (e.g., if the length of the $k^{th}$ free space is less than the length of the data, or byte alignment requirements are not met), the process 700 proceeds to operation 710.

At operation 710, a next free space is identified based on the first queue and the second queue. For example, the next free space is a $p^{th}$ free space of the memory space, where p is the remainder when (k+1) is divided by K. That is, if k is smaller than K, then the $(k+1)^{th}$ free space is identified as the next free space; if k is equal to K, then the first free space (e.g., the starting free space) in the memory space is identified as the next free space. The process 700 then proceeds to operation 708 after operation 710, where the next free space is determined as to whether it can store the data.

At operation 712, the data is stored in the $k^{th}$ free space. For example, the data is stored in a subspace of the $k^{th}$ free space.

At operation 714, an address corresponding to a start address of the data is added to the first queue, and an address corresponding to an end address of the data is added to the second queue. In some implementations, as shown in FIG. 6A, the start address of the data is added to the first queue, and the end address of the data is added to the second queue. In some implementations, as shown in FIG. 6B, an address immediately before the start address of the data is added to the first queue, and an address immediately following the end address of the data is added to the second queue.

At operation 716, if all free spaces in the memory space have been checked and none of them can store the data, the process 700 ends at operation 718. For example, if the data cannot be stored in any of the K free spaces as indicated by the first queue and the second queue, the memory space is full and cannot store more data. If the data can be stored in one of the free spaces in the memory space, process 700 can continue to operation 704, where the next data to be stored in the memory space is received.

Figure 8:
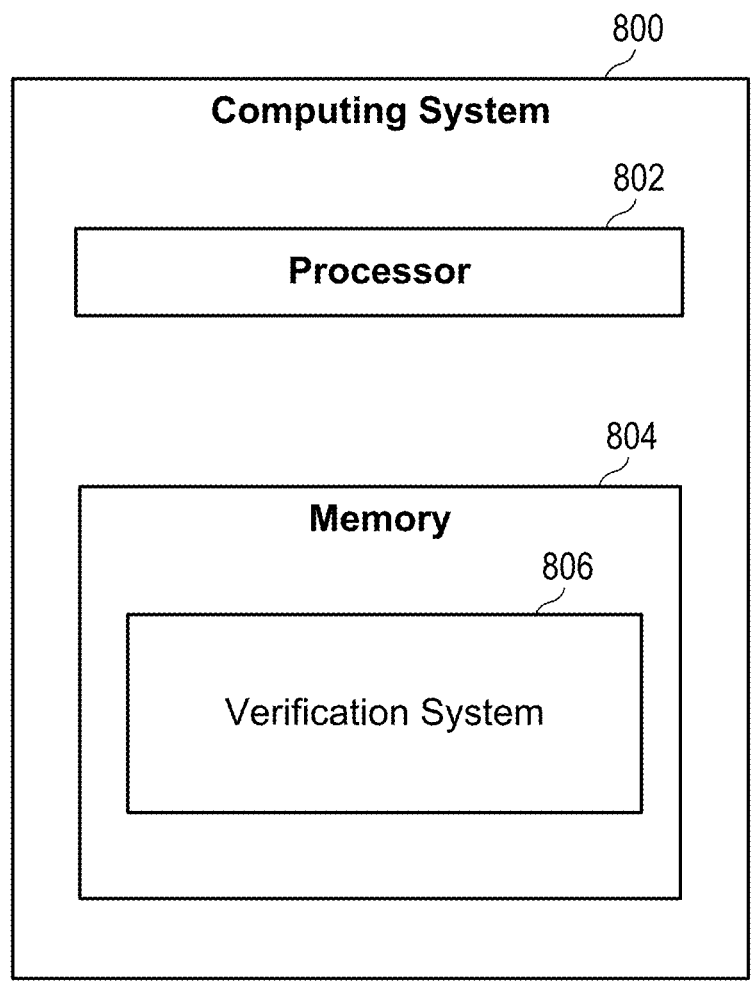
FIG. 8 illustrates a block diagram of an example computing system implementing a verification system, according to some implementations of the present disclosure.

FIG. 8 illustrates an example computing system 800 implementing a verification system 806 (e.g., the verification system 500 of FIG. 5), according to some implementations of the present disclosure. The computing system 800 can be a single computing device (e.g., a server) or can include multiple computing devices (e.g., a network of servers or a datacenter).

The computing system 800 includes a processor 802 which represents any number of processors that each can include any number of processor cores. The computing system 800 also includes a memory 804 which can include volatile memory elements, nonvolatile memory elements, and combinations thereof.

In some implementations, the memory 804 stores an application of a verification system 806, which is executed using the processor 802. The verification system 806 can include a memory allocation manager (e.g., the memory allocation manager 512 of FIG. 5) configured to execute a memory allocation policy. In some implementations, e.g., as shown in FIGS. 6A-7, the memory allocation policy can instruct the allocation of a memory space based on a first queue and a second queue each having addresses that indicate free spaces in the memory space.

The present disclosure also provides a non-transitory computer-readable storage medium. The non-transitory computer-readable storage medium stores one or more instructions that are executable by a computer system. For example, the non-transitory computer-readable storage medium can be the memory 804 shown in FIG. 8, and the instructions may be executed by the computer system 800 shown in FIG. 8. When being executed by the computer system, the instructions in the storage medium can implement method for allocating memory space as shown in FIGS. 5-7.

The non-transitory computer-readable storage medium can be an internal storage unit of the device described in any of the foregoing embodiments. For example, the non-transitory computer-readable storage medium can be a hard disk or an internal memory of the device. The non-transitory computer-readable storage medium can also be an external storage device of the device, such as a plug-in hard disk, a smart media card (SMC), a secure digital (SD) card, a flash card, etc. Further, the non-transitory computer-readable storage medium can also include an internal storage unit and the external storage device.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

As used in this disclosure, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, the phraseology or terminology employed in this disclosure, and not otherwise defined, is for the purpose of description only and not of limitation. Any use of section headings is intended to aid reading of the document and is not to be interpreted as limiting; information that is relevant to a section heading may occur within or outside of that particular section.

As used in this disclosure, the term "about" or "approximately" can allow for a degree of variability in a value or range, for example, within 10%, within 5%, or within 1% of a stated value or of a stated limit of a range.

As used in this disclosure, the term "substantially" refers to a majority of, or mostly, as in at least about 50%, 60%, 70%, 80%, 90%, 95%, 96%, 97%, 98%, 99%, 99.5%, 99.9%, 99.99%, or at least about 99.999% or more.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "0.1% to about 5%" or "0.1% to 5%" should be interpreted to include about 0.1% to about 5%, as well as the individual values (for example, 1%, 2%, 3%, and 4%) and the sub-ranges (for example, 0.1% to 0.5%, 1.1% to 2.2%, 3.3% to 4.4%) within the indicated range. The statement "X to Y" has the same meaning as "about X to about Y," unless indicated otherwise. Likewise, the statement "X, Y, or Z" has the same meaning as "about X, about Y, or about Z," unless indicated otherwise.

Particular implementations of the subject matter have been described. Other implementations, alterations, and permutations of the described implementations are within the scope of the following claims as will be apparent to those skilled in the art. While operations are depicted in the drawings or claims in a particular order, such operations are not required be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations are not required in all implementations, and the described components and systems can generally be integrated together or packaged into multiple products.

Accordingly, the previously described example implementations do not define or constrain the present disclosure. Other changes, substitutions, and alterations are also possible without departing from the spirit and scope of the present disclosure.

The foregoing description of the specific implementations can be readily modified and/or adapted for various applications. Therefore, such adaptations and modifications are intended to be within the meaning and range of equivalents of the disclosed implementations, based on the teaching and guidance presented herein.

The breadth and scope of the present disclosure should not be limited by any of the above-described example implementations, but should be defined only in accordance with the following claims and their equivalents. Accordingly, other implementations also are within the scope of the claims.

What is claimed is:

1. A method comprising:
receiving data to be stored in a memory space, wherein the memory space comprises one or more free spaces;
identifying, based on a first queue and a second queue, a first free space of the one or more free spaces, wherein the first queue comprises one or more addresses corresponding to end addresses of the one or more free space, and the second queue comprises one or more addresses corresponding to start addresses of the one or more free spaces;
storing the data in the first free space;
adding, to the first queue, an address corresponding to a start address of the first free space; and
adding, to the second queue, an address corresponding to an end address of the first free space.

2. The method of claim 1, wherein the first queue comprises an end address of the memory space, and wherein the second queue comprises a start address of the memory space.

3. The method of claim 2, wherein the first queue and the second queue each comprise K addresses arranged in an ascending order, wherein K is a positive integer.

4. The method of claim 3, wherein identifying the first free space comprises:
identifying a $k^{th}$ free space of the one or more free spaces, wherein k is an integer that satisfies $1 \leq k \leq K$, and wherein the $k^{th}$ free space is located between a $k^{th}$ address in the second queue and a $k^{th}$ address in the first queue; and
in response to determining that a size of the $k^{th}$ free space is larger than or equal to a size of the data, determining the $k^{th}$ free space as the first free space.

5. The method of claim 4, wherein identifying the first free space further comprises:
in response to determining that the size of the $k^{th}$ free space is smaller than the size of the data and that k is less than K, identifying a $(k+1)^{th}$ free space of the one or more free spaces, wherein the $(k+1)^{th}$ free space is located between a $(k+1)^{th}$ address in the second queue and a $(k+1)^{th}$ address in the first queue; and
in response to determining that a size of the $(k+1)^{th}$ free space is greater than or equal to the size of the data, determining the $(k+1)^{th}$ free space as the first free space.

6. The method of claim 4, wherein identifying the first free space further comprises:
in response to determining that the size of the $k^{th}$ free space is smaller than the size of the data and that k is equal to K, identifying a starting free space of the one or more free spaces, wherein the starting free space is located between a start address in the second queue and a start address in the first queue; and
in response to determining that a size of the starting free space is greater than or equal to the size of the data, determining the starting free space as the first free space.

7. The method of claim 1, wherein the start address of the data in the first free space satisfies aligning requirements of the data.

8. The method of claim 1, wherein the method is implemented by a verification system.

9. The method of claim 8, wherein the verification system is configured to verify a memory controller.

10. The method of claim 9, wherein the method further comprises:
instructing the memory controller to perform a read operation on the data in the memory space; and
comparing a result of the read operation performed by the memory controller and a result generated by the verification system.

11. The method of claim 9, wherein the method further comprises:
instructing a memory controller to perform a program operation to store data in the memory space; and
comparing a result of the program operation performed by the memory controller and a result generated by the verification system.

12. The method of claim 8, wherein the verification system is a universal verification methodology (UVM) system configured to execute a memory allocation policy.

13. A verification system, comprising:
one or more processors; and
one or more memories storing one or more instructions for execution by the one or more processors to perform operations comprising:
receiving data to be stored in a memory space of a verification system, wherein the memory space comprises one or more free spaces;
identifying, based on a first queue and a second queue, a first free space of the one or more free spaces, wherein the first queue comprises one or more addresses corresponding to end addresses of the one or more free space, and the second queue comprises one or more addresses corresponding to start addresses of the one or more free spaces;
storing the data in the first free space;
adding, to the first queue, an address corresponding to a start address of the first free space; and
adding, to the second queue, an address corresponding to an end address of the first free space.

14. The verification system of claim 13, wherein the first queue comprises an end address of the memory space, and wherein the second queue comprises a start address of the memory space.

15. The verification system of claim 13, wherein the first queue and the second queue each comprise K addresses arranged in an ascending order, wherein K is a positive integer.

16. The verification system of claim 15, wherein identifying the first free space comprises:
identifying a $k^{th}$ free space of the one or more free spaces, wherein k is an integer that satisfies $1 \leq k \leq K$, and wherein the $k^{th}$ free space is located between a $k^{th}$ address in the second queue and a $k^{th}$ address in the first queue; and
in response to determining that a size of the $k^{th}$ free space is larger than or equal to a size of the data, determining the $k^{th}$ free space as the first free space.

17. The verification system of claim 16, wherein identifying the first free space further comprises:
- in response to determining that the size of the $k^{th}$ free space is smaller than the size of the data and that k is not equal to K, identifying a $(k+1)^{th}$ free space of the one or more free spaces, wherein the $(k+1)^{th}$ free space is located between a $(k+1)^{th}$ address in the second queue and a $(k+1)^{th}$ address in the first queue; and
- in response to determining that a size of the $(k+1)^{th}$ free space is greater than or equal to the size of the data, determining the $(k+1)^{th}$ free space as the first free space.

18. The verification system of claim 16, wherein identifying the first free space further comprises:
- in response to determining that the size of the $k^{th}$ free space is smaller than the size of the data and that k is equal to K, identifying a starting free space of the one or more free spaces, wherein the starting free space is located between a start address in the second queue and a start address in the first queue; and
- in response to determining that a size of the starting free space is greater than or equal to the size of the data, determining the starting free space as the first free space.

19. The verification system of claim 13, wherein the verification system is universal verification methodology (UVM) system configured to execute a memory allocation policy.

20. A non-transitory, computer readable medium, storing one or more instructions executable by a computer system to perform operations to perform operations comprising:
- receiving data to be stored in a memory space, wherein the memory space comprises one or more free spaces;
- identifying, based on a first queue and a second queue, a first free space of the one or more free spaces, wherein the first queue comprises one or more addresses corresponding to end addresses of the one or more free space, and the second queue comprises one or more addresses corresponding to start addresses of the one or more free spaces;
- storing the data in the first free space;
- adding, to the first queue, an address corresponding to a start address of the first free space; and
- adding, to the second queue, an address corresponding to an end address of the first free space.

* * * * *